United States Patent [19]

Franz

[11] 4,231,697
[45] Nov. 4, 1980

[54] BOTTLE PACKAGING AND UNPACKAGING MACHINE

[76] Inventor: Henry H. Franz, 3201 Falls Cliff Rd., Baltimore, Md. 21211

[21] Appl. No.: 926,958

[22] Filed: Jul. 21, 1978

[51] Int. Cl.³ .................... B65G 57/10; B65G 59/02
[52] U.S. Cl. ........................................ 414/37; 53/536; 414/46; 414/68; 414/89; 414/108; 414/119; 414/417
[58] Field of Search ............... 414/37, 46, 68, 89, 414/108, 119, 417; 53/535, 536

[56] References Cited

U.S. PATENT DOCUMENTS

| 1,657,182 | 1/1928 | Schaefer | 53/535 |
| 3,553,929 | 1/1971 | Revicki | 414/46 X |
| 3,865,258 | 2/1975 | Muler | 414/37 |
| 3,960,280 | 6/1976 | Stolzer | 414/119 X |

Primary Examiner—Stephen G. Kunin
Assistant Examiner—George F. Abraham
Attorney, Agent, or Firm—Kemon & Estabrook

[57] ABSTRACT

An apparatus for removing a plurality of aligned containers from a conveyor and positioning them in spaced rows upon a supporting platform in a tiered arrangement. The containers are removed from the platform in the tiered arrangement and enveloped within a protective bag or like for storage purposes. The containers may be subsequently removed from the protective envelope and positioned upon the supporting platform from where they may be delivered in rows to a conveyor.

7 Claims, 7 Drawing Figures

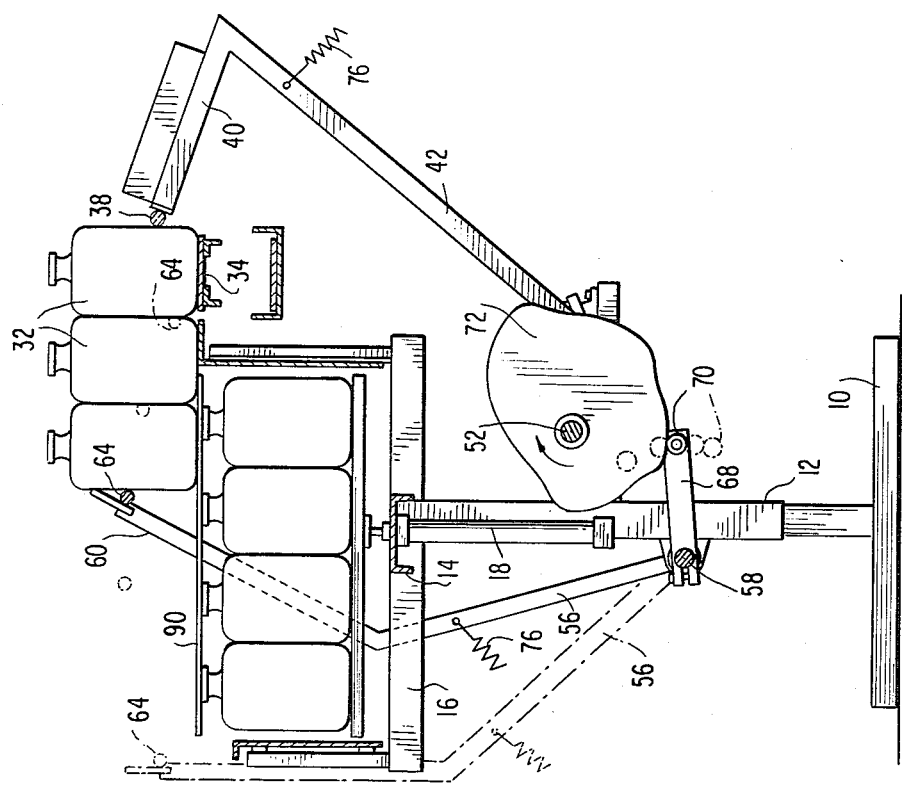
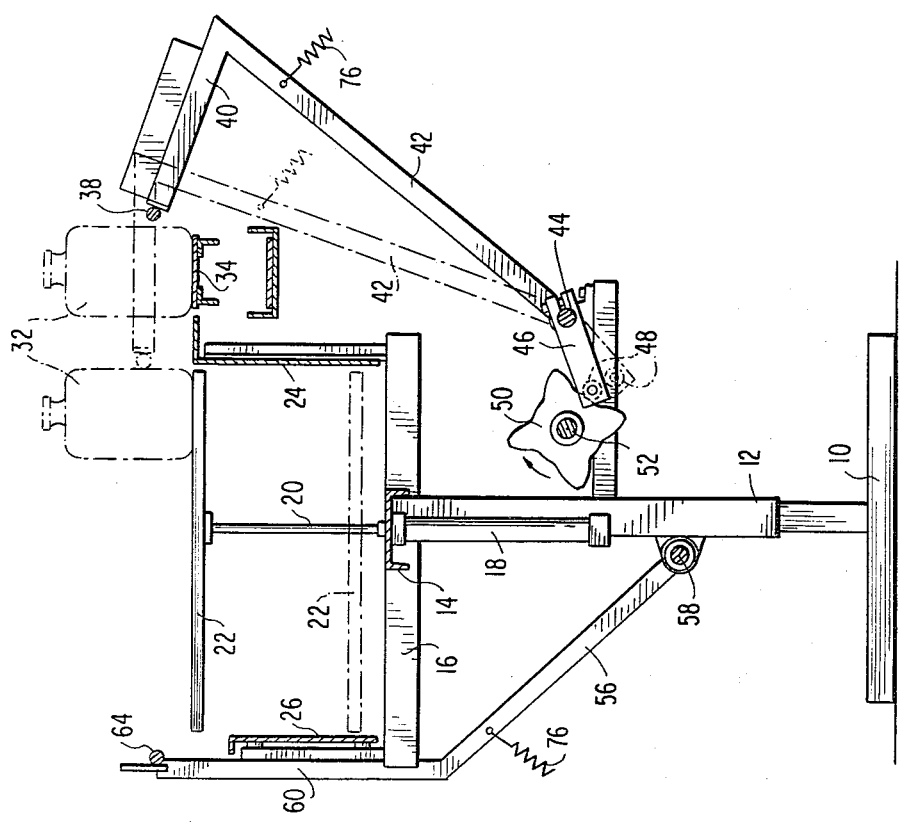

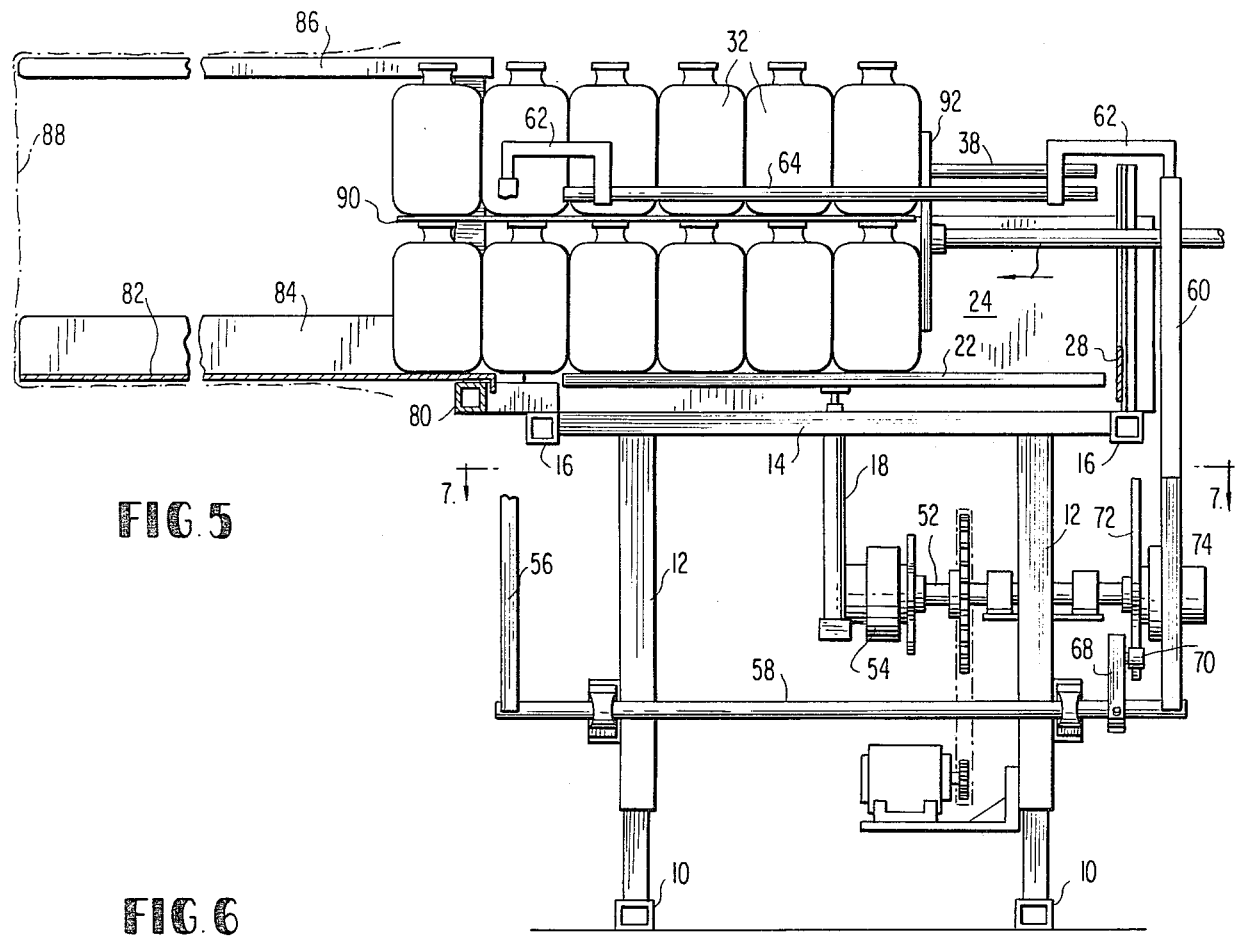
FIG.5
FIG.6
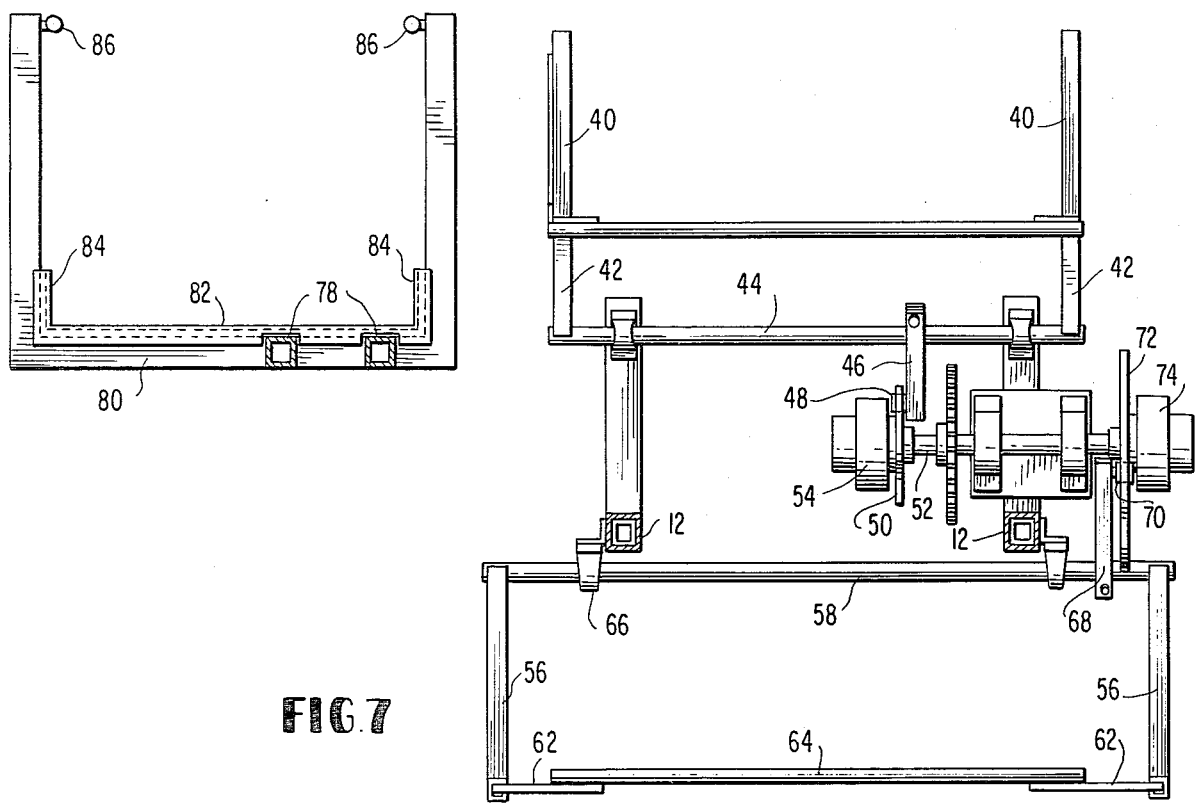
FIG.7

BOTTLE PACKAGING AND UNPACKAGING MACHINE

BACKGROUND OF THE INVENTION

The present invention pertains to the placing or positioning of containers upon a conveyor.

In the art of filling and closing containers, such as plastic bottles, the containers are very often placed on a conveyor by a manual operation after which they are directed through a filling operation and then a capping or closure operation. Such an operation can become a slow and laborious task, while at the same time increasing operating costs.

In the present-day operation of a plant engaged in the filling of containers with milk, it is becoming standard procedure to utilize plastic containers of a half a gallon or gallon size. In many instances, the plastic bottles are received from a bottle manufacturer in package form and same are manually opened and the bottles placed by hand upon a conveyor, where they move through a filling machine and are subsequently capped or have a closure applied thereto. This type of operation requires a number of operators to effectively handle the bottles during the course of filling same.

Another type of operation is one wherein a bottle-making machine is associated with a bottle-filling machine. In an installation of this type, the bottle-making machine delivers the plastic bottles to a conveyor which moves said bottles through the filling machine, after which they are capped or closed. In situations where the filling machine becomes inoperative the conveyor line is soon filled with plastic bottles, and it then becomes necessary to effectively remove said plastic bottles from the conveyor and store same or to close down the bottle-making machine. The latter situation can pose numerous problems as can the necessity of removing and storing a large number of plastic bottles, which in itself would require a number of people, thereby raising the cost of the bottle-making operation.

SUMMARY OF THE INVENTION

The present invention is directed to an apparatus for packaging and/or unpackaging a number of plastic containers, such as bottles or the like.

The apparatus of the present invention is readily adaptable for use with a conveyor that is moving plastic bottles from a bottle-making machine to a bottle-filling machine. In a situation wherein the filling machine becomes inoperative, but it is desirable or imperative to maintain the production of the bottle-making machine, the apparatus of the present invention is capable of effecting the removal from said conveyor of a number of bottles and the grouping or arranging of said bottles in such a manner that they can be enveloped in a plastic membrane or bag or in any other suitable receptacle and subsequently stored. In a situation wherein the filling machine is capable of filling the plastic bottles at a rate faster than the bottles can be made by the bottle-making machine, it then becomes desirable to take some bottles out of storage and add them to the conveyor. The converse also holds true, wherein the filling machine is incapable of filling bottles as fast as they can be made and placed on the conveyor. In situations of this type, the apparatus of the present invention can effectively group and remove some of the bottles from the conveyor and envelope them in a protective bag or other receptacle, which is placed in storage, or, on the other hand, plastic bottles may be removed from storage bags and delivered to the conveyor, so that they will move through the filling machine. Thus, the apparatus of the present invention is capable of taking bottles from storage bags or other receptacles and delivering them to a conveyor, where the filler machine is capable of filling bottles at a rate faster than the bottle-making machine can make bottles and place them on the conveyor. On the other hand, where bottles can be made faster than they can be filled, the present apparatus is capable of removing bottles from the conveyor and grouping said bottles and then enveloping them in a protective envelope or other receptacle for storage purposes.

BRIEF DESCRIPTION OF THE DRAWINGS

FIG. 3 is an end elevational view showing the pusher bar member for engaging the plastic bottles or containers and moving them from a conveyor onto the apparatus of the present invention;

FIG. 4 is a view similar to FIG. 3, showing a pusher bar member for moving the plastic bottles from the apparatus of the present invention onto a conveyor;

FIG. 5 is a view similar to FIG. 2 showing the apparatus of the present invention in the process of enveloping the plastic bottles or containers in suitable bag or other receptacle for storage;

FIG. 6 is an end elevational view of a support or rack for receiving and holding the protective envelope or other receptacle within which the plastic bottles or containers are placed for storage, the view being taken on the lines 6—6 of FIG. 2; and FIG. 7 is a horizontal sectional view of the drive mechanism for the apparatus of the present invention, the view being taken on the lines 7—7 of FIG. 5.

DESCRIPTION OF THE PREFERRED EMBODIMENT

Figure 2:
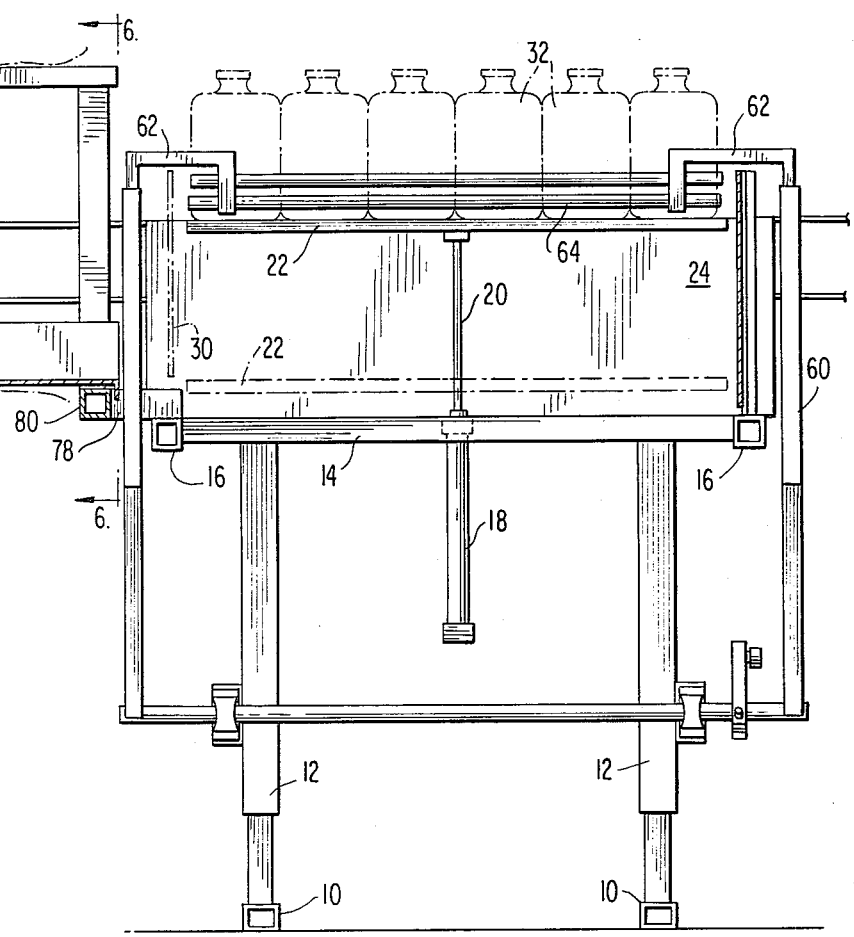
FIG. 2 is a front elevational view of the apparatus shown in FIG. 1, with certain of the drive mechanism omitted in the interest of clarity.

Referring to the drawings, there is shown in FIGS. 2 and 5 a pair of base members 10 that are disposed in spaced parallel relation with respect to one another, with each base member having mounted thereon in a plane normal thereto a telescopic leg member 12. The telescopically adjustable leg members 12 have secured to their upper ends a horizontally extending plate 14 which has secured to its respective ends channel arms 16 that are disposed in a horizontal plane parallel to the plane of the base members 10.

The plate 14 has mounted thereon a vertically extending cylinder 18 which has projecting therefrom a piston rod 20 that is in turn connected to a horizontally disposed elevating platform 22. The channel arms 16 have supported thereon vertically extending plate members 24 and 26, FIG. 1, which constitute side members and in conjunction with end plates 28 and 30 define a trough or compartment for the reception of rows of plastic containers or bottles 32 which are positioned upon the elevating platform 22. The rows of plastic bottles 32 supported on the platform 22 are shown in the various figures of the accompanying drawing as being six in number; however, it is to be understood that this is purely for purpose of illustration as the number of botties in a row on said platform 22 does not have any bearing upon the invention of the present application.

Figure 1:
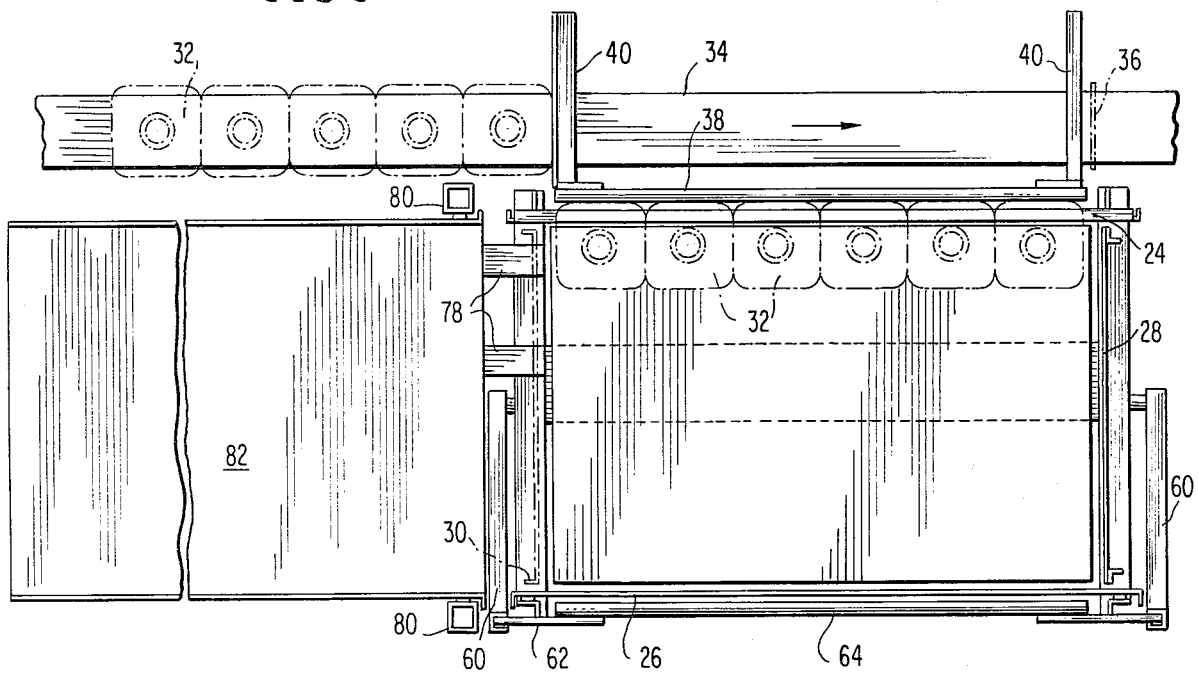
FIG. 1 is a plan view of the apparatus embodying the present invention, positioned adjacent a segment of a conveyor with plastic bottles or containers thereon.

The base members 10, which support the plate 14 by means of the leg members 12, are positioned adjacent a conventional endless conveyor 34, FIGS. 1 and 4, so that plastic bottles 32 which have been made by a plastic bottle-making machine, not shown, can be placed upon the conveyor 34 for delivery to a filler machine, not shown. A stop plate 36 is manually insertable and removable from the conveyor 34 for the purpose of engaging and stopping the movement of the bottles or containers 32 on the conveyor 34. A row of bottles or containers that have been stopped by the stop plate 36 on the conveyor 34 may be removed therefrom by an enlongated pusher bar 38 that is connected to and carried by a pair of spaced arms 40. The arms 40 are connected to depending levers 42 that have their lower ends connected to a rocker shaft 44, FIGS. 3 and 7, which in turn is provided with a depending segment 46 having a roller 48 in its lower end that engages a cam element 50 carried by a cam or driveshaft 52. The shaft 52 is driven by a suitable motor, not shown, and the cam 50 is provided with an air clutch 54 having a valve control to effect the engagement of the cam 50 with said shaft 52.

A second or front pusher bar assembly is provided and it consists of a pair of angularly disposed levers 56, FIG. 4, that are connected in spaced parallel relation to a rocket shaft 58 carried by the leg members 12. The levers 56 terminate in vertically extending arms 60 that are adapted to have an oscillating movement in planes parallel to the planes of the end plate members 28 and 30. The upper ends of the arms 60 terminate in brackets 62 which are connected to one another by an elongated bar member 64 that is adapted to engage the plastic containers or bottles positioned on the platform 22 for forcing them from the platform onto the conveyor 34. The shaft 58 is supported in suitable bearings 66 carried by the leg members 12 for rotation or oscillation and said shaft has secured thereto an arm 68, FIGS. 4 and 7, which has a roller 70 in the free end thereof that engages a cam 72 connected to the drive shaft 52. A suitable air clutch 74 provided with a valve control member, not shown, is also mounted on said drive shaft 52 for controlling the movement of said cam 72. The levers 42 and 56 of the front and rear pusher bar members 38 and 62 are each provided with a suitable return spring 76 that causes the pusher bars 38 and 64 to return to their dwell or inoperative positions.

The channel shaped arm 16 adjacent the end plate member 30, FIGS. 1 and 2, is provided with a plurality of extensions or projections 78, FIGS. 1 and 2, which constitute a support for a "U"-shaped bracket 80. The bracket 80, FIG. 6, has supported on the bottom thereof an elongated pan 82 having flanged sides 84. The bracket 80 also has mounted at its upper ends a pair of bar members 86, so that said pan and bars constitute a form or support for an envelope or bag element 88.

In the use of the apparatus of the present invention, plastic bottles or containers may be received from a conveyor in suitable groups or rows that may be arranged in tiered formation and then moved into an envelope or bag which can be tied or sealed so that the bottles can be moved into another form of receptacle and may then be stored. In addition, the apparatus of the present invention is capable of receiving bags or other containers of plastic bottles or containers and having said bag or envelope removed from said bottles or containers and then have the bottles or containers delivered to a conveyor. As an alternative, said apparatus may be used as a means for holding or storing plastic bottles in a limited quantity for a short period of time.

While the apparatus of the present invention is susceptible of various uses with a conveyor, it has been found to be highly adaptable for use with a conveyor that is associated with a bottle-making machine and a bottle-filling machine. In many instances it has been found to be highly advantageous to be able to form and make plastic containers or bottles by suitable machinery and to have said plastic bottles or containers delivered by said machine to a conveyor so that the bottles or containers may be delivered to a bottle-filling machine from whence they would undergo a filling operation such as in the milk industry. It has been found in some instances that the bottle or container-making machine is capable of producing bottles or containers faster than they can be filled by the filling machine, and in situations of this type the conveyor then becomes loaded or incapable of moving all of the finished bottles or containers. In a situation of this type, the present apparatus is capable of removing bottles or containers from the conveyor and to cause said bottles or containers to be placed in an envelope or other receptacle which can be removed and placed in stoarge. On the other hand, if the removal of a relatively few bottles from the conveyor would enable the conveyor to keep operating for delivering bottles to a filling machine then the apparatus of the present invention is capable of removing a certain number of bottles or containers from said conveyor and holding said bottles in storage for short periods of time. On the other hand, if the filling operation is capable of filling bottles or containers faster than the bottle-making machine is capable of producing bottles, then the apparatus of the present invention can receive packages of bottles from storage and deliver said bottles to the conveyor so as to maintain a steady flow of bottles to the filling machine.

In a situation wherein the bottle-making machine is producing bottles at a rate greater than the filling machine is capable of filling same a stop plate 36 may be manually inserted across the conveyor 34, FIG. 1, which will cause the bottles or containers 32 to be collected on the conveyor at a point opposite the apparatus of the present invention. When the bottles have been collected on the conveyor 34 opposite the apparatus of the present invention, the cylinder 18 is actuated so as to elevate the platform 22 to its uppermost position, which is shown in full lines in FIGS. 2 and 3, and at which position it will be on the same plane as the conveyor 34. With the platform 22 so elevated the driveshaft 52 is rotated under the action of a suitable motor, not shown, so that the air clutch 54 may be actuated to effect a rotation of the cam 50, thereby imparting movement to the depending segment 46 and effect a rocking movement of the rocker shaft 44, which will cause the levers 42 and arms 40 to be moved from the full line position of FIG. 3 to the dotted line position of FIG. 3. This movement of the levers 42 and arms 40 will cause the pusher bar 38 to engage a plurality of plastic bottles or containers 32 positioned on the conveyor 34 and to move them onto the surface of the platform 22. At the time that the plastic containers or bottles are moved from the conveyor onto the platform 22 the cam roller 48 on the arm 46 will have moved past the high point of the cam and will be then moving to a low point of the cam so as to cause the arms 40 and levers 42 to be returned to their original or full line position.

The spring 76 will also aid the arms 40 to return to their initial position. Upon the return of the arms 40 to the full position of FIG. 3 additional bottles or containers will have moved into the position on the conveyor opposite the platform 22 so that when the roller 48 on the arm 46 strikes another high point on the cam 50, the levers 42 and arms 40 will again be moved from the full line position to the dotted line position causing a second row of bottles or containers to be moved from the conveyor 34 onto the platform 22. This operation will continue until such time as the surface of the platform 22 has been filled with rows of plastic bottles or containers. Once the platform has been so filled, the cylinder 18 is actuated so as to lower the platform with the plastic bottles or containers thereon to the position wherein the platform reaches the dotted line position of FIG. 2. At this time, a suitable divider or spacer 90 is placed upon the top of the plastic bottles or containers, FIGS. 4 and 5, so that a second tier of plastic bottles or containers may then be positioned upon said divider or spacer in the same manner that the bottles or containers were initially placed upon the platform 22. While the present illustration shows two tiers of plastic bottles or containers, it should be borne in mind that by using different sizes of bottles or different sizes of enveloping bags or receptacles, any number of tiers may be employed. Of course, if a single tier is used the elevating cylinder may be deleted.

Once the top or upper tier of containers has been positioned upon the divider or spacer 90, an envelope or bag 88 is placed about the pin 82 and bar members 86. At this point, the end plate 30 is manually removed and a hand paddle or pusher 92, FIG. 5, is inserted through a suitable opening in the other end plate 28, so that the plastic bottles or containers may be manually moved off of the platform 22 and onto the pan or tray 82 within the envelope or bag 88. Once the containers or bottles have been positioned within the pan 82, said bottles and bag may then be withdrawn as a unit through the free end of the pan and bar members and then the open end of the envelope or bag may be closed by a suitable tie member or same may be sealed by any suitable means, after which the bag containing the plastic bottles or containers may then be placed in storage. This operation may then be continued until the desired number of bottles or containers have been placed in storage.

In the event that it is desired to retain or store the plastic bottles or containers for only a short period of time, then the platform would be loaded with bottles in the manner as described herein above and once the platform has been so loaded with two tiers of bottles same may then be moved onto the pan 82 and the platform returned to its original position for receiving additional bottles. The platform may then be loaded in the same general manner with two tiers of bottles and same would then have to be retained upon the platform until such time as they were to be redelivered to the conveyor.

In delivering bottles from the platform 22 to the conveyor 34 the platform is in a position so that the front pusher bar member 64, FIG. 2, may engage a row of plastic bottles or containers and through the movement of the arms 60 and levers 56 force said plastic bottles or containers 32 over the surface of the divider or spacer 90 to the position wherein the first row of bottles or containers will then be delivered to the conveyor 34.

The movement of the arms 60 and levers 56 is carried out by the roller 70 carried on the end of the arm 68 engaging the contour of the cam 72, which in turn causes a movement of the shaft 58 so as to move said lever and arms from the dotted line position to the full line position of FIG. 4. Thus, the continued engagement of the roller 70 with the cam 72 will cause the pusher bar 64 to move the bottles or containers across the surface of the divider or spacer 90 so as to position a row at a time of said bottles or containers upon the conveyor 34. The low points on the cam 72 will permit the conveyor to move the plastic bottles or containers along the conveyor surface so that a second row of bottles or containers may then be moved onto the conveyor as the roller 70 engages another high point on the cam surface 72. The arms 60 and levers 56 will be removed to the dotted line position of FIG. 4 under the action of the return spring 76. The rotation of the cam 72 is due to the cam being mounted on the drive shaft 52 which shaft is driven by a suitable motor, not shown, and wherein the air clutch 74 is actuated to cause said cam to be driven by said shaft 52. Once all of the bottles or containers supported on the divider or spacer 90 have been moved onto the conveyor under the action of the pusher bar 64 carried by the arm 60 and levers 56, the spring 76 will then return the pusher bar 64 to its original position. At this time the divider or spacer may be manually removed and the platform 22 may then be elevated under the action of the air cylinder 18, so that the bottles or containers supported on the platform 22 are then in alignment with the conveyor. At this time, the pusher bar 64 may then be moved into engagement with the bottles or containers mounted on the platform 22 and cause said bottles or containers to be moved onto the conveyor in the manner as described herein above.

If it is desired to remove bottles or containers from storage, then the envelope or bag containing said bottles or containers may be placed on the platform 22 in its lowermost position after the end plate 30 has been manually positioned in proper position. The end plate 28 is provided with an aperture of suitable size that enables the envelope or bag to be withdrawn from around the plastic bottles or containers subsequent to said bag and bottles being placed upon the platform 22. This arrangement then permits the pusher bar 64 to be actuated so as to engage the row of bottles or containers and move same over the spacer or divider 90 until a row of bottles or containers has been placed upon the conveyor. This operation can be continued in the manner described herein above regarding the storing of bottles on the platform 22 and can be carried out until all of the bottles that were initially contained within the envelope or bag have been placed upon the conveyor. At this time, another bag or envelope may then be positioned upon the platform 22 and the envelope or bag withdrawn through the opening provided in the end plate 28.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A bottle packaging and unpackaging apparatus for use with a conveyor delivering bottles from a bottle-making machine to a bottle-filling machine, a plurality of spaced base members having vertically disposed leg members mounted thereon, a compartment having side and end members and supported on said leg members, an elevating platform positioned within said compartment, a pusher bar positioned on one side of said compartment for intermittently pushing in row form a plurality of bottles from said conveyor across a side of said compartment and onto said platform, a second pusher bar located on the other side of said compartment for intermittently pushing in row form a plurality of bottles from said compartment onto said conveyor, each of said pusher bars having a rocker shaft connected thereto for moving said pusher bars across said compartment towards the other pusher bar, a rotatable drive shaft carried by one of said leg members with means for rotating said drive shaft, and means connecting said drive shaft with each of said rocker shafts for intermittently moving said pusher bars towards and away from one another over said platform.

2. A bottle packaging and unpackaging apparatus as set forth in claim 1 wherein a plurality of cams are mounted on said drive shaft, said first pusher bar being of a length commensurate with that of said compartment and connected to a pair of arms arranged in spaced parallel relation to one another, said arms being connected to depending levers the ends of which are secured to the respective rocker shaft which is supported on one of said leg members, and the means connecting the drive shaft and rocker shaft comprising an arm connected to said rocker shaft and having a roller connected thereto and engaging one of the cams on said drive shaft for moving said pusher bar across said conveyor.

3. A bottle packaging and unpackaging apparatus as set forth in claim 1 wherein a bracket is secured to said compartment, an elongated pan supported on said bracket in the plane of said compartment and an ejector positioned in said compartment engaging said bottles on said platform for moving said bottles in a path of movement between said pushers from said compartment onto said pan.

4. A bottle packaging and unpackaging apparatus as set forth in claim 3 wherein said bracket is provided with spaced bar members with an elongated open-ended envelope supported on said bars and enclosing said pan for receiving from said pan said bottles in row and tier formation for storing same.

5. A bottle packaging and unpackaging apparatus as set forth in claim 1 wherein said second pusher bar is provided with brackets at the end thereof, said brackets connected to vertically extending arms adapted to move in planes spaced from and parallel to said end members of said compartment, said arms connected to inclined levers that are secured to said rocker shaft, the means for connecting said drive shaft and rocker shaft comprising an arm secured to said rocker shaft and having a roller mounted thereon for engaging a cam on said drive shaft for moving said rocker shaft and pusher bar.

6. A bottle packaging and unpackaging apparatus as set forth in claim 1 wherein said drive shaft is provided with air clutch members for rotatably engaging said cams with said drive shaft.

7. A bottle packaging and unpackaging apparatus as set forth in claim 1 wherein said pusher bars are provided with resilient members to return said pusher bars to their inoperative position upon the disengagement of said cams from said drive shaft through air clutch members.

* * * * *